Jan. 5, 1926.

C. H. RHENBOTTOM 1,568,417

STEERING DEVICE

Filed Jan. 14, 1925

Inventor
Charles H. Rhenbottom

By Milo B. Stevens Co
Attorneys

Jan. 5, 1926.
C. H. RHENBOTTOM
1,568,417
STEERING DEVICE
Filed Jan. 14, 1925    2 Sheets-Sheet 2
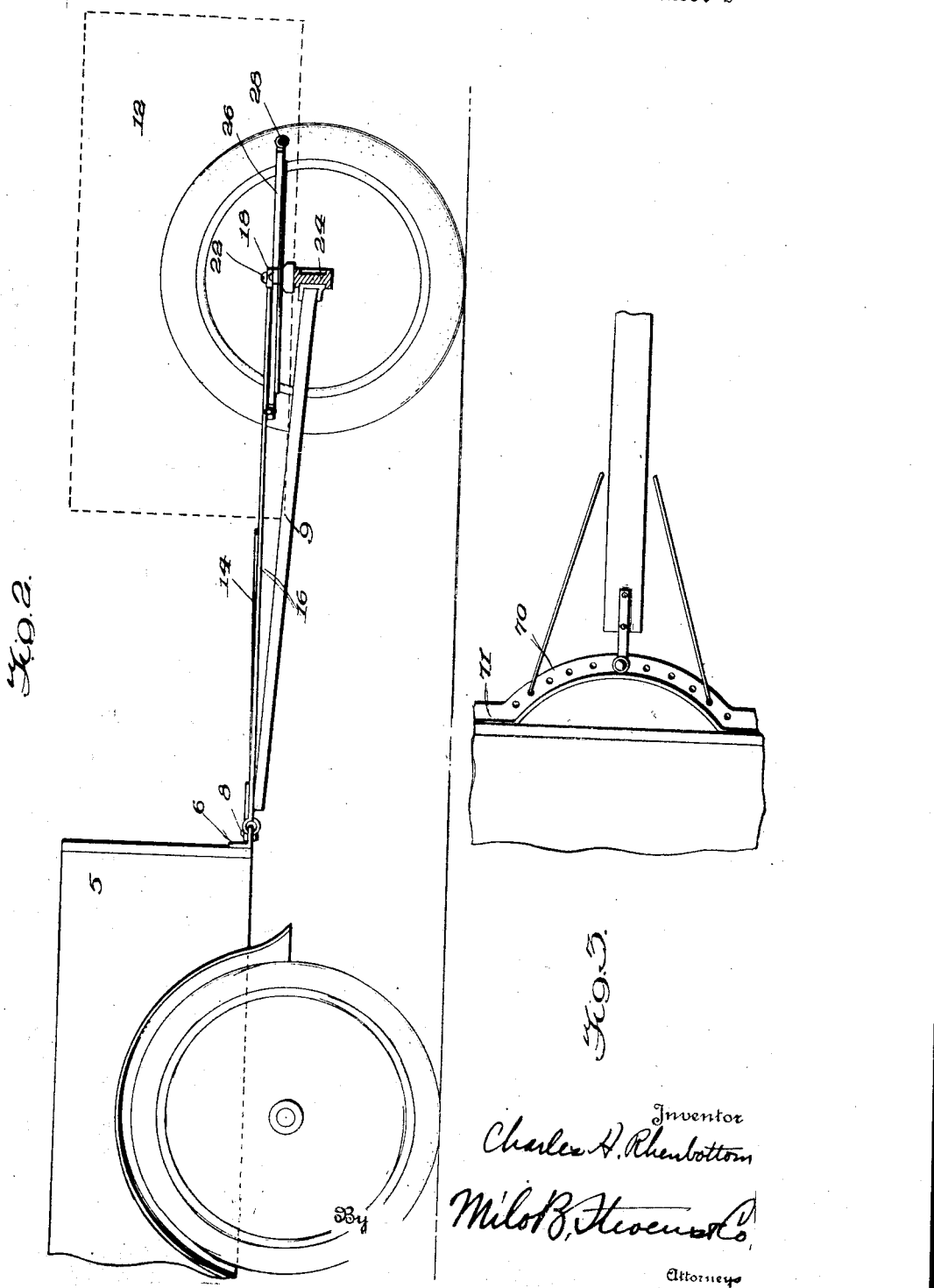
Inventor
Charles H. Rhenbottom
By Milo B. Stevens & Co.
Attorneys Patented Jan. 5, 1926.

1,568,417

UNITED STATES PATENT OFFICE.

CHARLES H. RHENBOTTOM, OF COLDWATER, MICHIGAN.

STEERING DEVICE.

Application filed January 14, 1925. Serial No. 2,374.

*To all whom it may concern:*

Be it known that I, CHARLES H. RHENBOTTOM, a citizen of the United States, residing at Coldwater, in the county of Branch and State of Michigan, have invented new and useful Improvements in Steering Devices, of which the following is a specification.

This invention relates to steering devices especially adapted for use in connection with trailers.

Briefly stated, an important object of this invention is to provide a steering device by means of which the wheels of a trailer are automatically turned in response to a change in the direction of travel of the propelling vehicle so that the trailer may accurately follow in line with the propelling vehicle.

A further object is to provide a steering device of the character specified which is of highly simplified construction, durable in use and which may be applied without in any way interfering with the operation of the vehicle or lessening the carrying capacity of the same.

Other objects and advantages will be apparent during the course of the following description.

In the accompanying drawings forming a part of this application and in which like numerals are employed to designate like parts throughout the same, Figure 1 is a fragmentary plan view of the invention in use;

Fig. 2 is a vertical section through the invention, and

Fig. 3 is a fragmentary plan view of a slight modification of the invention.

Figure 1:
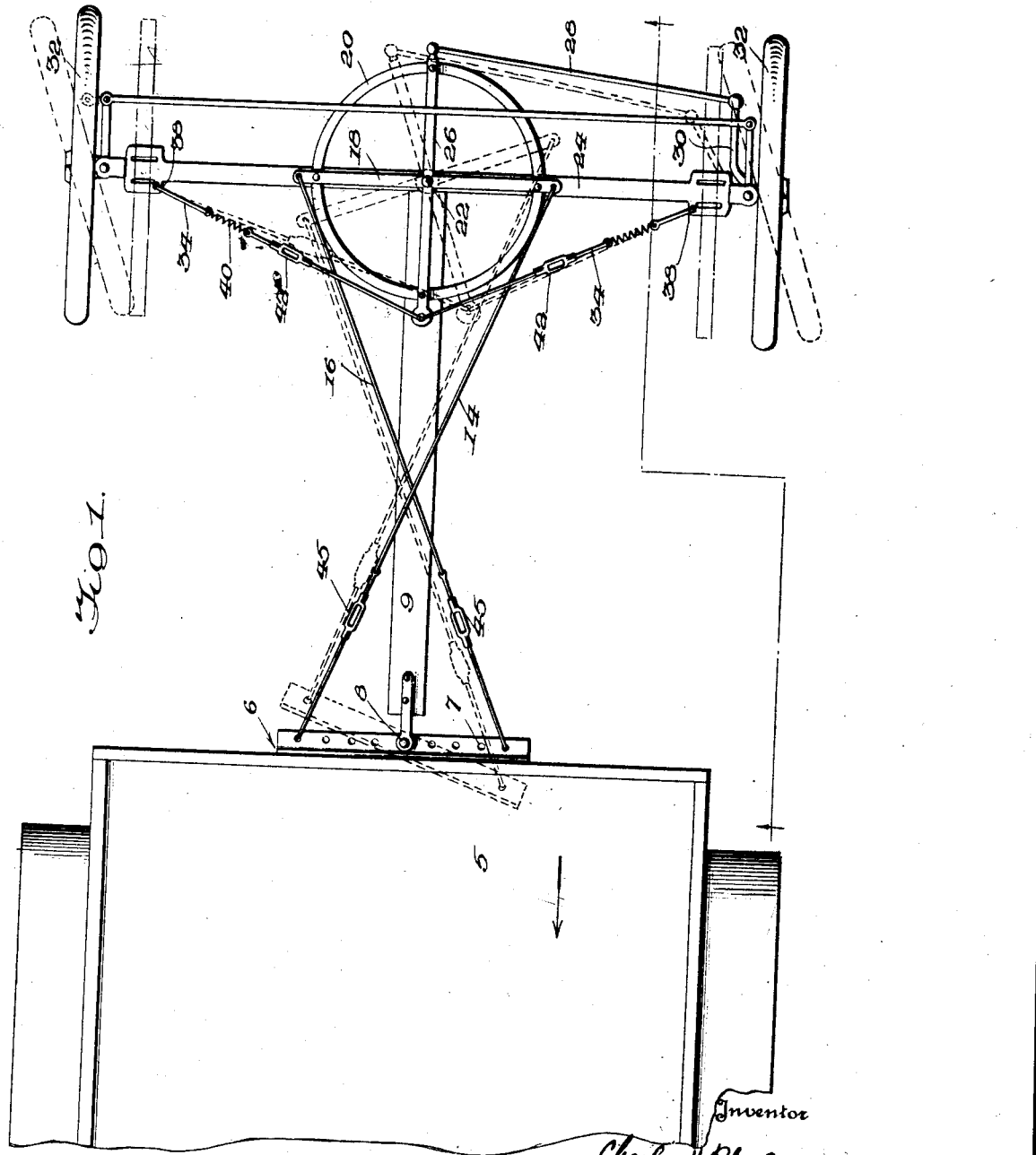

In the drawings, the numeral 5 designates the propelling vehicle having its rear end provided with an angle bar 6, the horizontal flange of which is formed with openings 7. One of the openings 7 is adapted for the reception of a fastening device 8 by means of which the draw bar 9 may be attached to the propelling vehicle.

The rear portion of the draw bar 9 is attached in any suitable or convenient manner to the trailer 12. The trailer 12 may be a two-wheel affair as illustrated or it may be provided with four wheels. Also the trailer may be of that type which bears a portion of the load while the remaining portion of the load is borne by the propelling vehicle 5. It, however, forms no part of the invention and this is mentioned merely to explain that the invention is capable of use in connection with types of trailers other than illustrated.

The improved steering mechanism consists of a pair of crossed cables designated by the numerals 14 and 16 connected at their forward ends to the bar 6.

The rear portions of the cables 14 and 16 are connected to a transversely extending arm 18 secured in any suitable manner upon a steering ring or annulus 20. The transversely extending arm 18 is also connected to a pivot member 22 mounted upon the axle 24 of the trailer.

It will be seen that when the propelling vehicle makes a turn one of the cables pulls to impart a turning movement to the ring 20.

The ring 20 is also provided with a longitudinally extending arm 26 terminating beyond the rear side of the ring and having connection with a steering rod 28. The steering rod 28 is in turn connected to the steering arm 30 of the wheel 32.

The forward portion of the arm 26 is connected to rods or stabilizing cables 34 anchored at their outer ends to the axle as indicated at 38, and having coil springs 40 interposed therein to normally retain the ring 20 in a more or less neutral position. Turn buckles 42 may be interposed in the members 34 to control the effective length of the same. The cables 14 and 16 may also be provided with turn buckles 45.

In operation when the propelling vehicles make a turn either the cable 14 or the cable 16 is drawn taut and a portion of the turning movement is imparted to the annulus 20. This turning movement thus imparted to the annulus 20 results in the longitudinal movement of the steering rod 28 and the wheels 32 are turned so as to bring about the travel of the trailer directly in line with the propelling vehicle.

A steering mechanism constructed in accordance with this invention may be installed without interfering with the operation of the vehicle and without in any way lessening the carrying capacity of either the propelling vehicle or the trailer.

In carrying out the invention the curved angle bar 70, as illustrated in Fig. 1, may be employed and it will be observed the ends 71 of the bar 70 are adapted to be secured flatly in engagement with the propelling vehicle by bolts or other suitable fastening devices.

Having thus described the invention, what is claimed is:

1. The combination with a propelling vehicle, of a trailer associated with the propelling vehicle and having an axle and wheels, a steering arm for controlling said wheels, an annulus rotatably mounted on said axle and having an arm connected to said steering rod, cables extending from said propelling vehicle and having connection with said annulus, means to stabilize the annulus and normally hold the same in a neutral position, and a draw bar connecting the propelling vehicle and the trailer.

2. In a steering mechanism for trailers, the combination of an annulus, a control arm secured to the annulus and extending beyond the outer edge of the same, a steering rod connected to one end of the arm, stabilizing links connected to the other end of the arm and having springs, the outer portions of said links being anchored, a second arm arranged at right angles to the first-named arm and being connected to the annulus, crossed cables connected to the outer ends of said second-named arm, turn buckles interposed in said cables, an attaching bar connected to the forward portion of said cables, and a draw bar connected to said attaching bar.

In testimony whereof I affix my signature.

CHARLES H. RHENBOTTOM.